(No Model.)
G. HUNT.
STOVE LID.
No. 357,126. Patented Feb. 1, 1887.
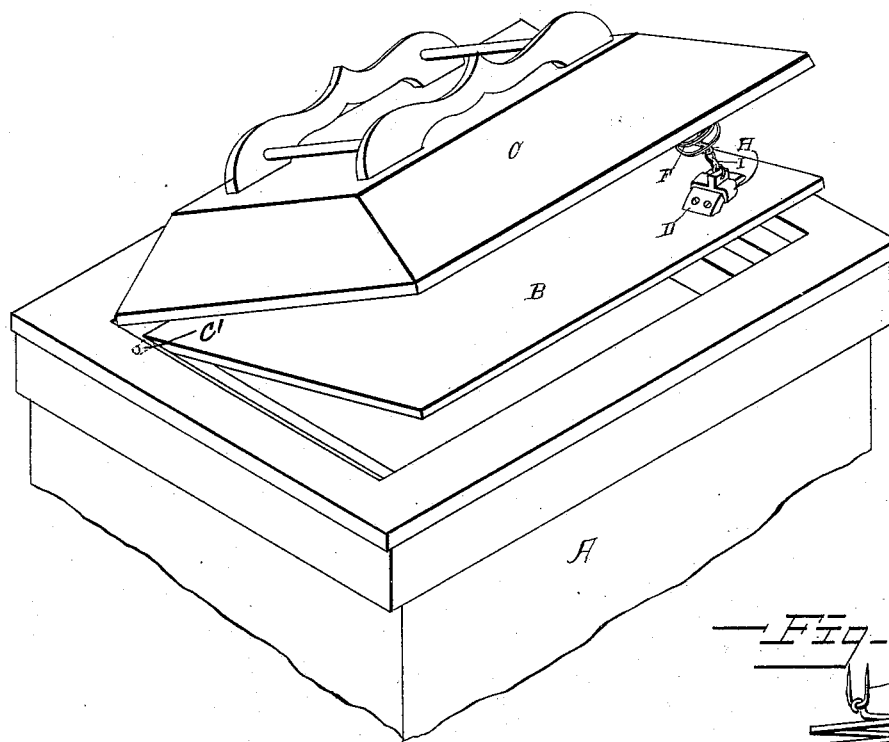
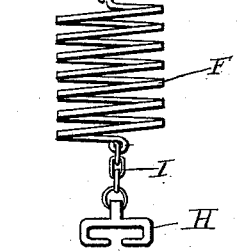
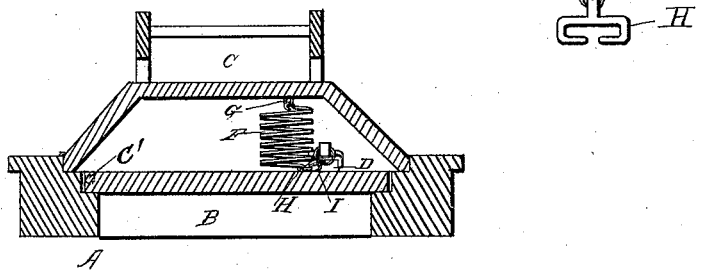
Witnesses
James M. Hatton
E. G. Siggers
Inventor
George Hunt.
By his Attorneys
C. A. Snowden

UNITED STATES PATENT OFFICE.

GEORGE HUNT, OF ELLENVILLE, NEW YORK.

STOVE-LID.

SPECIFICATION forming part of Letters Patent No. 357,126, dated February 1, 1887.

Application filed March 10, 1886. Serial No. 194,743. (No model.)

*To all whom it may concern:*

Be it known that I, GEORGE HUNT, a citizen of the United States, residing at Ellenville, in the county of Ulster and State of New York, have invented a new and useful Improvement in Stove-Lids, of which the following is a specification, reference being had to the accompanying drawings.

My invention relates to an improvement in stove-lids, and is particularly designed for parlor-stoves; and it consists in the peculiar construction and combination of devices that will be more fully set forth hereinafter, and particularly pointed out in the claims.

In the drawings, Figure 1 is a perspective view of my invention, showing the lids partly open. Fig. 2 is a transverse vertical sectional view of the same with the lids closed. Fig. 3 is a detail view of the connecting spring, chain, and loop.

A represents the top of the stove of the class known to the trade as "parlor-stoves." The stoves are provided with inner lids, B, and outer lids, C, which latter are usually made of some ornamental shape and serve as ornaments or urns for the stove.

The object of my invention is to obviate the necessity of having first to remove the outer lid and then the inner lid, in order to obtain access to the interior of the stove, by opening both lids simultaneously, and thus avoid the annoyance of having to remove the inner lid separately. To this end I pivot the inner lid at one edge to the top of the stove, as at C', and provide the lid with an arm, D, which extends upwardly at a suitable angle. The outer lid, C, is also hinged at one edge to the top of the stove, and on the under side of the said lid is secured a coiled extensile spring, F, by means of a staple or keeper, G. To the free end of the spring F is attached a catch or loop, H, by means of a chain, I. This keeper or loop is adapted to slip over the outer end of the arm D of the inner lid, and thereby secure the lids together. When the upper lid is turned on its hinge or pivots, the lower lid is also raised, as shown in Fig. 1. When it is desired to raise the upper lid without raising the lower lid, the upper lid is first partly raised and the keeper H is moved outwardly from the arm D of the lower lid, thereby disengaging the said lower lid, when the upper lid may be opened to its full extent without raising the lower lid, as will be very readily understood.

Having thus described my invention, I claim—

1. The combination of the lower hinged lid having the arm or catch D with the upper hinged lid having the spring and keeper or loop connected thereto for engaging the arm of the lower lid, for the purpose set forth, substantially as described.

2. The combination of the lower lid with the upper lid having a chain-and-spring connection with the lower lid, as set forth.

In testimony that I claim the foregoing as my own I have hereto affixed my signature in presence of two witnesses.

GEORGE HUNT.

Witnesses:
    HIRAM H. TERWILLIGER,
    S. MAXWELL TAYLOR.